Sept. 13, 1960  C. E. WELLER  2,952,814
POWER SUPPLY
Filed April 21, 1958
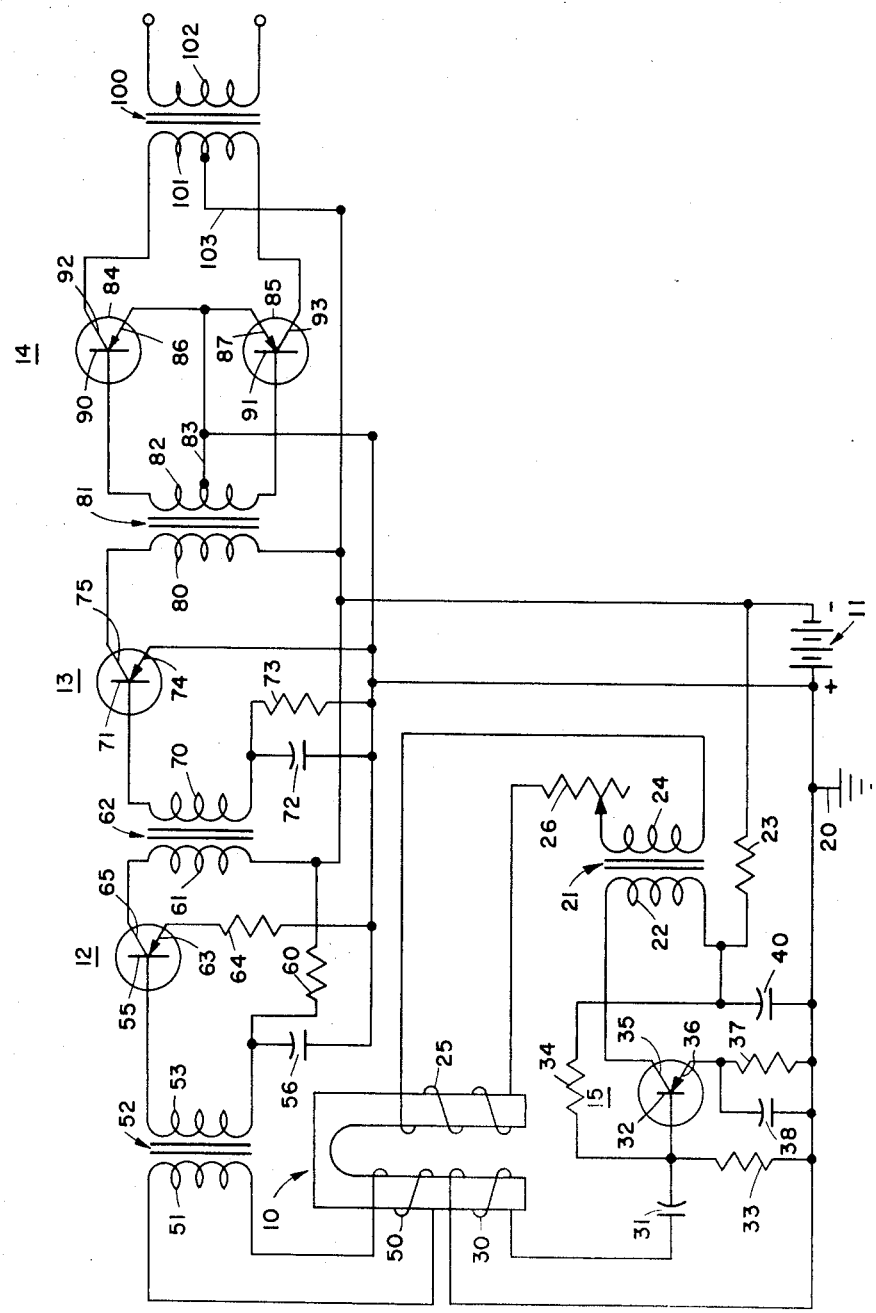
INVENTOR:
CHARLES E. WELLER
BY: James Todorovic
HIS ATTORNEY

United States Patent Office 2,952,814
Patented Sept. 13, 1960

2,952,814

POWER SUPPLY

Charles E. Weller, Houston, Tex., assignor to Shell Oil Company, New York, N.Y., a corporation of Delaware Filed Apr. 21, 1958, Ser. No. 729,756

6 Claims. (Cl. 330—1)

This invention relates to power supplies, and more particularly pertains to constant frequency alternating current power supplies which are capable of providing substantial quantities of power.

Constant frequency alternating current power supplies which provide substantial amounts of power are used in many places, especially portable power supplies which are capable of operating from batteries or other sources of stored energy. Such power supplies are used in portable recorders, camera drives and many other recording devices which require a constant frequency source of power. These power supplies are also particularly useful in seismic exploration where they are used for advancing the seismic record as well as for applying suitable timing marks to the seismic record.

In the past these requirements for portable constant frequency power have been supplied by a flexible member which was provided with current-interrupting contact-points and arranged to be driven by the current from a battery which was interrupted at the natural frequency of the flexible member by means of the contact-points. The frequency of such a power source is a function of the elastic properties of the flexible member and the displacement forces applied by the battery current. While the natural frequency of vibrating members such as tuning forks remain substantially constant over long periods of time, the same is not true of the mechanical force which drives the vibrating member. Wearing of the contact points and changes in the spring's tension used for closing cause considerable increase and decrease in the mechanical displacement force of the battery current and thus results in substantial changes in the frequency of the alternating current supplied. Of course, any variation in the frequency of the alternating current materially diminishes the value of the many records obtained in a seismic exploration. This is especially true where it is desired to compare records taken of the same area but at different times.

Accordingly, it is the principal object of this invention to provide a unique battery operated constant frequency power supply which is capable of supplying substantial amounts of alternating current power.

A further object of this invention is to provide a novel battery operated constant frequency power supply which is small, compact and very rugged.

A still further object of this invention is to provide a constant frequency power source utilizing a tuning fork which is driven by a first inductance coil while a second inductant coil is used as a pick-up to generate an alternating current signal which is amplified by a transistorized amplifier.

This invention attains the above objects and other advantages by providing a tuning fork which is driven by means of an inductance coil energized from a direct current power source such as a battery. A second inductance coil is disposed so as to generate an alternating current signal when the fork is vibrating, which signal is amplified by a transistorized amplifier. The final stage of the amplifier utilizes two transistors biased so as to operate as a class B amplifier in a push-pull relationship to each other.

These and other objects and advantages of this invention will be more readily understood by those skilled in the art from the following detailed description of a preferred embodiment when taken in conjunction with the attached drawing which illustrates a schematic arrangement of a power supply constructed according to this invention.

Referring to the drawing there is shown a tuning fork 10 which is driven by an inductance coil energized by a battery 11. An alternating current signal is generated by means of an inductance coil disposed adjacent the tuning fork, the signal being amplified by a first stage amplifier 12 which is biased to operate as a class A amplifier. The output of the amplifier 12 is further amplified by a second class A amplifier 13 whose output in turn is amplified by push-pull amplifier 14 which is biased to operate as a class B amplifier. A second alternating current signal is also generated by the vibration of the tuning fork and is used to energize a separate amplifying stage 15 which in turn is disposed to switch the battery current supplied to the inductance coil 25 on and off at the resonant frequency of the tuning fork 10.

The positive side of the battery 11 is connected to a ground bus 20 while the negative side is connected to the primary winding 22 of the transformer 21 through a resistance 23. The secondary 24 of the transformer 21 is connected in parallel with an inductance coil 25 which is disposed to drive the tuning fork 10. A variable resistance 26 is disposed in series with the connections between the transformer secondary 24 and the inductance coil 25 to provide a means for adjusting the driving force of the inductance coil 25.

A second inductance coil 30 is disposed so that the vibration of the tuning fork 10 will generate an alternating current signal therein. One end of the inductance coil 30 is connected to the ground bus 20 while the other end is connected through a coupling capacitor 31 to the base 32 of a transistor which forms the amplifying stage 15. The base 32 is connected to the ground bus 20 through a biasing resistance 33 and in addition is connected to the negative side of the battery 11 through another biasing resistance 34 adjacent the common connection between resistor 23 and the primary 22 of the transformer 21. The emitter of the transistor is connected to the ground bus through a stabilizing resistance 37 and a coupling capacitor 38 while the collector 35 is connected to the other end of the primary 22 of the transformer 21. A decoupling capacitor 40 is disposed between connection from the base 32 to the negative side of battery and ground.

From the above description it can be seen that the inductance coil 25 will drive the tuning fork 10 at its resonant frequency. The vibration of the tuning fork 10 is utilized to induce an alternating current signal in a second industance coil 30. This alternating signal is amplified by the amplifying stage 15 which in turn switches the power on and off to the inductance coil 25 at the resonance frequency of the tuning fork 10. Thus, the tuning fork 10 is driven at its resonance frequency by means of the inductance coil 25 which is energized from the battery 11. While a tuning fork is shown other vibrating members could also be used, for example, a vibrating reed formed of magnetic material.

A third inductance coil 50 which is also disposed so that the vibrations of the tuning fork 10 will induce an alternating current signal therein is connected in parallel with the primary 51 of the transformer 52. One end of the secondary 53 of the transformer 52 is connected to the base 55 of the transistor 12 while the other end of the secondary is connected to the negative side of the battery 11 though a resistance 60. A de-coupling capacitor 56 is connected between the other end of the secondary and ground bus. The emitter 63 of the transistor is connected to the ground through a resistance 64 while the collector 65 is connected to one end of the primary 61 of a transformer 62, whose other end is connected directly to the negative side of the battery 11. The value of the resistances 60 and 64 should be chosen so that the transistor 12 is biased to operate as a class A amplifier. Also from the above description it can be appreciated that the transistor 12 is connected in what is commonly known as a common emitter configuration which means that the emitter 63 is shared by both the input and output side of the transistor.

One end of the secondary of the transformer 62 is connected to the base 71 of the transistor 13 while the other end is connected to ground through parallel connected resistance 73 and capacitance 72. The emitter 74 of the transistor is connected directly to ground while the collector 75 is connected to one end of the primary of a transformer 81 whose opposite end is connected to the negative side of the battery 11. It can thus be seen that the transistor 13 is also connected in a common emitter configuration and the value of the resistance 73 should be chosen so that the transistor is biased to operate as a class A amplifier.

The secondary 82 of the transformer 81 is provided with a center tap 83 which is connected to ground while the opposite ends of the secondary are connected to the bases 90 and 91 of the transistors 84 and 85, respectively. The emitter 86 of the transistor 84 is connected to the emitter 87 of the transistor 85 with the common connection between the two being connected to the ground bus. The collector 92 of the transistor 84 is connected to one end of the primary 101 of a transformer 100 while the collector 93 of the transistor 85 is connected to the opposite end of the primary 101. A center tap 103 on the primary 101 is connected directly to the negative side of the battery 11. The opposite ends of the secondary 102 are connected to the load (not shown) being supplied by the power supply.

From the above description it can be appreciated that this invention provides a very compact and rugged power supply which is capable of operating from a battery while supplying a constant frequency alternating current output. The tuning fork 10 supplies a constant frequency signal which is amplified by the three stages of amplification. The input to the first stage 12 is by means of a coupling transformer 52 with each of the succeeding stages being similarly coupled to the preceding stage so that the impedance of the input signal may be accurately matched to the input impedance of each stage. This insures maximum gain in overall efficiency.

While transformer coupling between amplifier stages 12 and 13 has been described and shown other methods may also be used, for example, both resistance capacitance and direct coupling have been successfully employed. In the case of resistance capacitance coupling one only has to provide the proper size capacitor to connect leads 65 and 71 in addition to suitable by-pass resistances between these leads and the negative side of the battery. If direct coupling is desired the lead 65 may be connected to lead 71 and the proper bias potential applied to the two stages. It is likewise possible to employ direct coupling between the push-pull stage transistors 84 and 85 if the load also has a center tap. Furthermore, direct coupling can be used between transistor 15 and inductance coil 25 as well as between inductance coil 50 and transistor 12 if desired.

The use of presently available transistors for the various stages permits the power supply to generate substantial amounts of power on the order of 10–25 watts. This amount of power is supplied without any of the disadvantages of prior power supplies such as variable frequency and wearing of contacts. The use of transistors results in a rugged compact unit which does not require a high voltage power supply in order to function. Hence, this invention should not be limited to the specific details of the above described embodiment but only to its broad spirit and scope.

I claim as my invention:

1. A constant frequency alternating current power supply comprising: a tuning fork having a predetermined frequency of vibration; a first inductance coil disposed to drive said tuning fork; a second inductance coil responsive to the vibration of said tuning fork to generate a first alternating current signal, switch means responsive to said first alternating current signal for coupling and decoupling a source of direct current to said first inductive coil at the predetermined frequency of said tuning fork whereby said tuning fork is driven by said first inductive coil; a third inductance coil responsive to the vibrations of said tuning fork to generate a second alternating current signal; said third inductance coil being coupled to a power amplifier.

2. A constant frequency alternating current power supply comprising: a tuning fork having a fixed frequency of vibration; an inductance coil coupled to a direct current power supply and disposed to drive said tuning fork; means responsive to the vibration of said tuning fork for making and breaking the coupling between said inductance and said direct current power supply at the fixed frequency of said tuning fork; inductive pick-up means disposed to generate an alternating signal upon vibration of said tuning fork; said signal being coupled to a power amplifier.

3. A constant frequency alternating current power supply comprising: a tuning fork formed of magnetic material and having a predetermined frequency of vibration; a first inductance coil disposed to drive said tuning fork; a second inductance coil disposed adjacent said tuning fork and responsive to the vibration of said tuning fork for generating a first alternating current signal; said first alternating current signal being coupled to the input side of a single stage amplifier, the output side of said amplifier being coupled to a direct current power source to alternately couple and decouple said direct current power source to said first inductance coil; a third inductance coil disposed adjacent said tuning fork and responsive to the vibration of said tuning fork for generating a second alternating current signal and means for amplifying said second alternating signal.

4. The power supply of claim 1 in which the switching means consists of a single stage transistor amplifier.

5. The power supply of claim 4 in which the switching means consists of a transistorized oscillator, the frequency of said oscillator being controlled by said first alternating current signal.

6. The power supply of claim 1 in which the power amplifier is a multiple stage transistorized amplifier.

References Cited in the file of this patent

UNITED STATES PATENTS

| | | |
|---|---|---|
| 1,896,238 | Hund | Feb. 7, 1933 |
| 2,704,431 | Steele | Mar. 22, 1955 |
| 2,738,386 | Van B. Roberts | Mar. 13, 1956 |
| 2,752,553 | Dunlap | June 26, 1956 |
| 2,901,555 | Klinkhamer et al. | Aug. 25, 1959 |